United States Patent [19]

Cole

[11] Patent Number: 4,736,629

[45] Date of Patent: Apr. 12, 1988

[54] MICRO-MINIATURE ACCELEROMETER

[75] Inventor: John C. Cole, Mercer Island, Wash.

[73] Assignee: Silicon Designs, Inc., Bellevue, Wash.

[21] Appl. No.: 812,137

[22] Filed: Dec. 20, 1985

[51] Int. Cl.[4] ........................................... G01P 15/125
[52] U.S. Cl. .................................... 73/517 R; 73/514; 324/60 C; 324/61 R
[58] Field of Search ................. 73/514, 517 R, 517 B; 324/60 C, 60 CD, 61 R; 361/280

[56] References Cited

U.S. PATENT DOCUMENTS

| 3,226,981 | 1/1966 | Mullins et al. | 73/517 R |
|---|---|---|---|
| 3,355,952 | 12/1967 | Romberg | 73/503 |
| 3,478,604 | 11/1969 | Evans | 73/517 |
| 3,498,138 | 3/1970 | Stewart | 73/517 B |
| 3,528,297 | 9/1970 | Lee | 73/517 R |
| 4,306,456 | 12/1981 | Maerfeld | 73/517 |
| 4,342,227 | 8/1982 | Petersen et al. | 73/510 |
| 4,345,474 | 8/1982 | Deval | 73/517 B |
| 4,430,895 | 2/1984 | Colton | 73/497 |
| 4,459,849 | 7/1984 | Calamera | 73/517 B |
| 4,483,194 | 11/1984 | Rudolf | 73/517 R |
| 4,598,585 | 7/1986 | Boxenhorn | 73/505 |

FOREIGN PATENT DOCUMENTS 498557  6/1976  U.S.S.R. ........................... 73/517 R

OTHER PUBLICATIONS

Corey, "Multi-Axis Clusters of Single-Axis Accelerometers with Coincident Centers of Angular Motion Insensitivity", presented at the 6th International Aerospace Symposium, Bedford, England, Mar. 23-26, 1970.

Primary Examiner—John Chapman
Attorney, Agent, or Firm—Christensen, O'Connor, Johnson & Kindness

[57] ABSTRACT

The accelerometer comprises a substrate (52), a metallic movable plate (50), and a mounting system (54) for mounting the movable plate such that it is positioned above the substrate and can rotate about a flexure axis (64) that is above and is substantially parallel to the substrate. The flexure axis divides the sensing element into first (66) and second (68) sections. The total moments of the first and second sections about the flexure axis are different, such that acceleration normal to the substrate tends to rotate the sensing element about the flexure axis. A first electrode (74) is mounted by the substrate adjacent the first section to form a first capacitor ($C_A$), and a second electrode (76) is mounted by the substrate adjacent the second section to form a second capacitor ($C_B$). A detector for measuring the relative capacitances of the first and second capacitors is provided comprising an integrator (166), an inverting amplifier (168), and switches (160, 162, 164) for periodically charging and discharging the capacitors in response to a clock signal. In one embodiment, the sensing element includes an internal opening (16, 56, 126) and the mounting system is positioned within the opening and includes a pedestal mounted to the substrate, and torsion bars (20, 22, 118, 120) and/or a beam (60, 114) connecting the pedestal to the sensing element. The sensing element preferably comprises a metallic plate, and the substrate preferably comprises a semiconductor upon which the detector and electrodes are fabricated in a single step process requiring no final assembly of components. In an embodiment adapted for high g applications, a pedestal (146) divides a plate member into first (148) and second (150) cantilevered beams that flex in the same direction in response to a given acceleration.

8 Claims, 3 Drawing Sheets

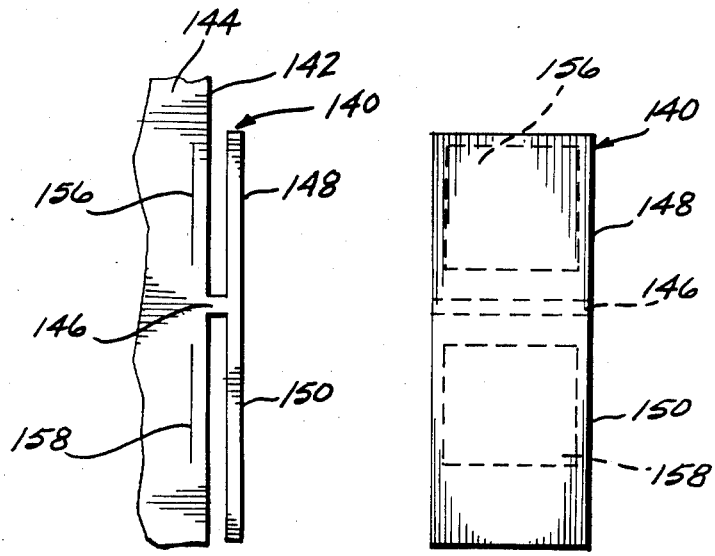

MICRO-MINIATURE ACCELEROMETER

FIELD OF THE INVENTION

The present invention relates to accelerometers, and, in particular, to micro-miniature, solid state accelerometers that may be fabricated and mounted on a semiconductor substrate.

BACKGROUND OF THE INVENTION

Micro-miniature, solid state accelerometers are used for a number of important applications, such as for acceleration sensors in missile safe and arm devices. One prior solid state accelerometer comprises a mass supported by a silicon beam upon which one or more piezoresistive sensing elements are formed. Under acceleration, the restoring force exerted by the beam on the mass induces stress in the sensing element. The resistance of the sensing element changes with the stress, and the change in resistance is converted to a differential voltage by using one or two sensing elements in a resistance bridge circuit.

The main problem with accelerometers using silicon piezoresistive sensing elements is temperature sensitivity. Doped silicon has a temperature coefficient of resistance of about several thousand parts per million per degree centigrade. The sensing elements therefore experience a change in resistance due to temperature changes as well as due to stress caused by acceleration. The temperature sensitivity of the output voltage can be reduced by completing the resistance bridge with resistors formed on the silicon beam adjacent to the sensing elements, but aligned such that they are insensitive to the stress. Although this arrangement works reasonably well, it nevertheless does not eliminate problems with temperature gradients across the silicon. In addition, the current through the bridge varies significantly over temperature, and trimming resistors located off the bridge must have temperature characteristics that track those of silicon.

Another prior solid state accelerometer design comprises a cantilevered beam of silicon dioxide fabricated on the surface of a silicon wafer and suspended over a well etched in the surface. A mass of metal is deposited on one side of the beam to provide sufficient sensitivity to acceleration. However, in this design the center of mass is offset from the centerline plane of the beam, thereby creating a sensitivity to accelerations in directions other than the intended sensitive direction.

Another prior solid state accelerometer design comprises a semiconductor flap member fixed to one side of a torsion bar. An electrode is located on a separate substrate that is attached to the flap member after fabrication. Acceleration is measured by comparing the variable capacitance between the electrode and the flap member with a fixed capacitance. This design has a number of drawbacks. Semiconductor materials such as silicon and silicon dioxide have relatively low densities. An inertial element made from silicon or silicon dioxide therefore has less mass and is less sensitive to acceleration than one of equal size made from heavier materials such as metals. Further drawbacks are that the voltage that must be applied to the variable capacitor to measure the capacitance creates an electrostatic force on the movable flap member that disturbs the value being measured. A further undesirable feature of this design is that the accelerometer requires the fabrication and assembly of two separate substrates. In addition, comparison of a variable with a fixed capacitance can introduce temperature sensitivities if the thermal coefficients of the two capacitors are not carefully matched. Finally, attachment of a torsion bar at two different locations onto a substrate of a material with a different thermal coefficient of expansion can introduce changes in longitudinal stress in the torsion bar due to changes in temperature, and such stress changes can result in a temperature sensitive scale factor for the accelerometer.

SUMMARY OF INVENTION

The present invention provides a micro-miniature, solid state accelerometer that overcomes the limitations of the prior solid state accelerometers described above.

In one aspect, the accelerometer of the present invention comprises a substrate, a sensing element comprising a metallic member, and mounting means for mounting the sensing element such that the sensing element is positioned above the substrate and can rotate about a flexure axis that is above and substantially parallel to the substrate. The flexure axis divides the sensing element into first and second sections. The total moment (mass times moment arm) of the first section about the flexure axis is different from the total moment of the second section about the flexure axis, such that acceleration normal to the substrate tends to rotate the sensing element about the flexure axis. A first electrode is mounted by the substrate adjacent the first section of the sensing element, the first electrode and first section together forming a first capacitor. Similarly, a second electrode is mounted by the substrate adjacent the second section of the sensing element, and the second electrode and the second section of the substrate together form a second capacitor. Detection means is provided coupled to the first and second capacitors for sensing rotation of the sensing element about the flexure axis.

The sensing element preferably comprises a metallic plate, and the substrate preferably comprises a semiconductor. The metal plate may include an internal opening, and the mounting means may comprise a pedestal mounted to the substrate and positioned within the opening, together with flexible support means connected between the metal plate and pedestal. In one embodiment, the support means comprises a pair of torsion members extending in opposite directions from the pedestal to the sensing element, the torsion members defining the flexure axis. In a second embodiment, the support means comprises a beam extending between the sensing element and pedestal in a direction parallel to the sensing element and substrate and perpendicular to the flexure axis. In a third embodiment, the support means comprises a box element surrounding the pedestal, a beam extending between the pedestal and box element, and a pair of torsion members extending in opposite directions from the box element to the sensing element.

In another aspect, the present invention provides a high g accelerometer that includes a plate member mounted above a substrate by a pedestal that divides the plate member into first and second cantilevered beams. The first and second fixed plates are positioned in the substrate adjacent the respective beams to form first and second capacitors. In response to acceleration normal to the substrate, the beams flex in the same direction, thereby varying the capacitance of the first and second capacitors. The fixed plates and beams are positioned and arranged such that the capacitances of the first and second capacitors are changed by different amounts in response to an acceleration. In a preferred embodiment, such differential change is accomplished by providing different total moments for the beams about the pedestal.

In another aspect, the present invention provides an accelerometer that includes an inertial mass, mounting means for mounting the inertial mass such that the inertial mass tends to move in response to acceleration along a sensitive axis, and first and second capacitors associated with the inertial mass, each capacitor comprising first and second plates. When the inertial mass moves, the capacitances of the first and second capacitors change by unequal amounts. The accelerometer further includes detection means for measuring the relative capacitances of the first and second capacitors, and for providing a corresponding output signal. The detection means includes an output terminal at which the output signal is produced, means for providing first and second reference voltages, an inverting amplifier having its input connected to the output terminal, an integrator having its output connected to the output terminal, and first, second and third switches. Each switch has a common terminal and A and B terminals. The common terminal of the first switch is connected to the first plates of the first and second capacitors. The A terminal of the first switch is connected to receive the first reference voltage, and the B terminal of the first switch is connected to the input of the integrator. The common terminal of the second switch is connected to the second plate of the first capacitor, the A terminal of the second switch is connected to the output of the inverting amplifier, and the B terminal of the second switch is connected to receive the second reference voltage. The common terminal of the third switch is connected to the second plate of the second capacitor, the A terminal of the third switch is connected to the second reference voltage, and the B terminal of the third switch is connected to the output terminal. Means are provided for causing the first, second and third switches to periodically change in concert between state A, wherein all switches have their common terminals connected to their A terminals, and state B wherein all switches have their common terminals connected to their B terminals.

BRIEF DESCRIPTION OF THE DRAWINGS

FIG. 5 is a cross-sectional view of a fifth embodiment of the accelerometer.

FIG. 6 is a top plan view of the accelerometer of FIG. 5.

DETAILED DESCRIPTION OF THE INVENTION

Figure 1:
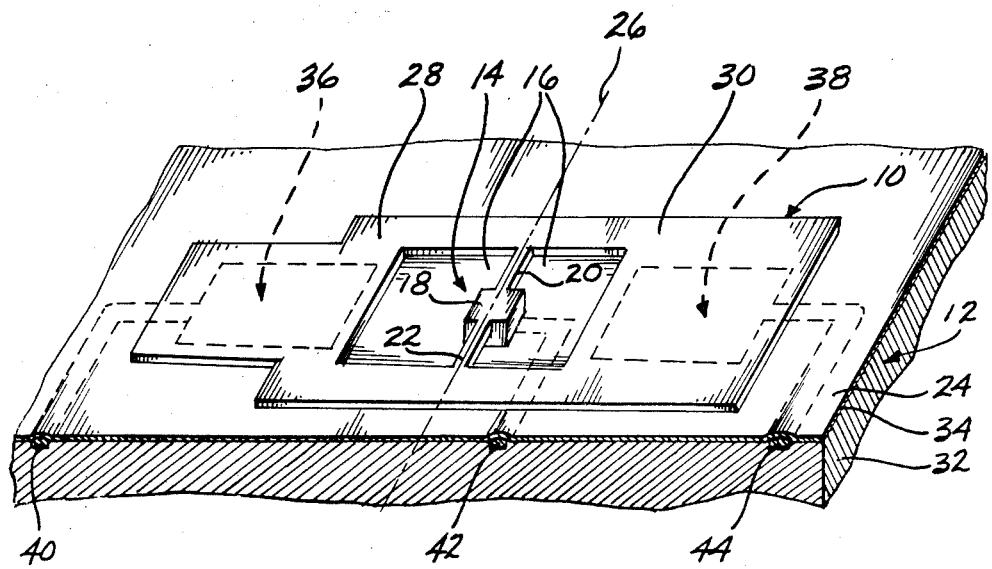
FIG. 1 is a perspective view of a first preferred embodiment of the accelerometer of the present invention.

One preferred embodiment of the accelerometer of the present invention is illustrated in FIG. 1. The accelerometer comprises movable plate 10 that is mounted above substrate 12 by mounting system 14. An internal area of movable plate 10 is removed to form opening 16. Mounting system 14 comprises pedestal 18 and torsion bars 20 and 22 positioned within opening 16, the torsion bars extending in opposite directions from the pedestal to the movable plate. Movable plate 10, pedestal 18 and torsion bars 20 and 22 are all fabricated from metal. The torsion bars define flexure axis 26 about which movable plate 10 can rotate with respect to pedestal 18 and substrate 12. Movable plate 10 and the upper surface 24 of substrate 14 are substantially planar, and mounting system 14 mounts movable plate 10 such that it is spaced above upper surface 24 and is parallel to the upper surface in the absence of acceleration normal to the upper surface.

Flexure axis 26 divides movable plate 10 into a first section 28 on one side of the flexure axis and a second section 30 on the opposite side of the flexure axis. The movable plate is constructed such that the total moment (i.e., mass times moment arm) of section 28 about flexure axis 26 is less than the total moment arm of section 30 about the flexure axis, i.e., the center of mass of the movable plate is offset (to the right in FIG. 1) from the flexure axis. Therefore in response to acceleration normal to upper surface 24, the movable plate tends to rotate about flexure axis 26, the degree of rotation being approximately proportional to the magnitude of the acceleration, and the direction of rotation corresponding to the direction of the acceleration, i.e., to whether the acceleration is directed into or out of the upper surface.

Substrate 12 comprises semiconductor layer 32 (only the upper portion of which is shown) covered by thin insulating layer 34. Semiconductor layer 32 normally comprises a silicon wafer upon which the electronics associated with the accelerometer are also fabricated, using conventional integrated circuit technology. Insulating layer 34 may comprise glass, silicon nitride, or any other suitable material compatible with integrated circuit technology. Conductive electrode or fixed plate 36 is formed in the upper surface of semiconductor layer 32 and is positioned underlying a portion of movable plate section 28. Conductive fixed plate 38 is also formed in the upper surface of semiconductor layer 32, and underlies a portion of movable plate section 30. Fixed plates 36 and 38 are preferably equal to one another in size and shape, and are preferably positioned symmetrically with respect to flexure axis 26.

Conductors 40, 42 and 44 are also formed in the upper surface of the semiconductor layer, and provide electrical connections to fixed plate 36, movable plate 10 and fixed plate 38, respectively. An opening is provided in insulating layer 34 underlying pedestal 18 to permit electrical contact between the pedestal and conductor 42. Fixed plates 36 and 38 and conductors 40, 42 and 44 are preferably fabricated at the same time as the associated electronic components using one or more conductive layers (e.g., polysilicon) of the integrated circuit process. As described below, fixed plate 36 and movable plate 10 form a first capacitor, and movable plate 10 and fixed plate 38 form a second capacitor. When movable plate 10 rotates about flexure axis 26 in response to acceleration, the capacitances of the first and second capacitors change in opposite directions, and such capacitance changes are detected and used to determine the direction and magnitude of the acceleration.

The sensitivity of the accelerometer illustrated in FIG. 1 is adjustable over a wide range by changing the geometry of movable plate 10 so as to vary its mass and the moment arms of sections 28 and 30 about flexure axis 26. The sensitivity may also be varied by varying the dimensions (and therefore the spring constants) of torsion bars 20 and 22. For a given movable plate and torsion bar geometry, the sensitivity of the accelerometer is increased by selecting a dense material with which to fabricate movable plate 10. Metals such as gold, iron and nickel are more dense than silicon and exert a larger force and torque for a given acceleration, thereby producing a larger deflection of movable plate 10 as compared with the deflection of a similar movable plate made of silicon. Furthermore, by achieving a center of inertial mass in the plan of the flexure axis, the accelerometer is virtually insensitive to accelerations parallel to upper surface 24.

In order to measure a cpacitance, it is necessary to apply a voltage difference between the capacitor plates. The applied voltage causes an electrostatic force of attraction between the plates. If this force causes a deflection that results in a change in capacitance, the process of measuring the capacitance disturbs the value of capacitance being measured. If the applied voltage is large enough and the capacitor spacing is sufficiently small, the resulting force will overcome the restoring force of the mounting system, causing the capacitor plates to pull together, rendering the device inoperative. This consideration sets the lower limit for sensitivity that can be achieved. An advantage of the accelerometer of the present invention is that fixed plates 36 and 38 are located such that the torque around flexure axis 26 caused by the voltage applied to fixed plate 36 tends to cancel the torque produced by the voltage on fixed plate 38. This canceling effect reduces or eliminates any perturbing deflections caused by the measuring voltages. A further advantage of using two variable capacitors located on opposite sides of a flexure axis is that the differential capacitance provides an output that is twice as sensitive as compared to a device using a single variable capacitor and a fixed capacitor. Furthermore, since each capacitor is composed of plates having identical composition, thermal coefficients of the capacitors will be essentially identical, a feature that eliminates a source of temperature sensitivity.

A further important advantage of the accelerometer of FIG. 1 is that it is relatively insensitive to differential thermal expansion or contraction. Movable plate 10 and mounting system 14 are composed of metal, whereas substrate 12 is principally composed of a semiconductor material such as silicon. The coefficient of thermal expansion of metal is significantly greater than that of silicon. Therefore as the temperature changes, the dimensions of movable plate 10 and mounting system 14 will change to a greater extent than the dimensions of substrate 12. By supporting the movable plate from a single, comparatively small pedestal 18, movable plate 10 and torsion bars 20 and 22 can expand and contract relative to substrate 12 without inducing stresses in the torsion bars that might affect the bias or sensitivity of the accelerometer.

Figure 2:
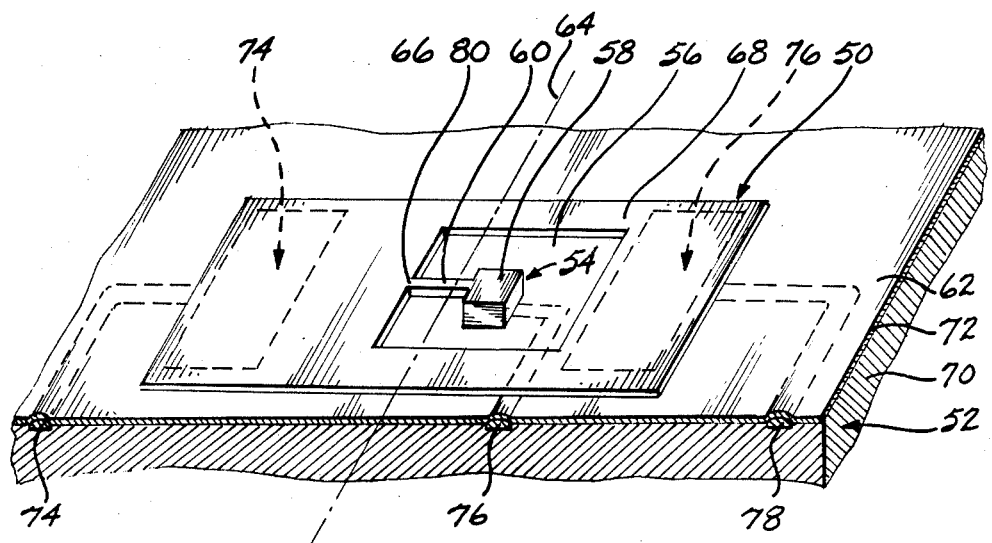
FIG. 2 is a perspective view of a second preferred embodiment of the accelerometer of the present invention.

A second preferred embodiment of the accelerometer of the present invention is shown in FIG. 2. This embodiment comprises movable plate 50 that is mounted above substrate 52 by mounting system 54. Movable plate 50 includes opening 56, and mounting system 54 comprises pedestal 58 and beam 60 formed within opening 56. Pedestal 58 is mounted to substantially planar upper surface 62 of substrate 52, and beam 60 extends parallel to the upper surface from pedestal 58 to movable plate 50. The pedestal and beam mount the movable plate such that it is spaced above upper surface 62 and parallel to the upper surface in the absence of acceleration normal to the upper surface. Movable plate 50 and mounting system 54 are composed of metal, and substrate 52 comprises semiconductor layer 70 and insulating layer 72.

In one embodiment, the center of mass of movable plate 50 is located at point 80 at the intersection of the movable plate and beam 60. It may be shown that in such an embodiment, movable plate 50 rotates about an apparent flexure axis 64 that is stationary in the plane of the plate and normal to the longitudinal axis of the beam 60, and that intersects the beam at a location spaced from pedestal 58 by a distance equal to one-third the length of the beam. Flexure axis 64 divides movable plate 50 into a first section 66 on one side of the flexure axis and a second section 68 on the opposite side of the flexure axis. Because the center of mass of the movable plate is positioned at point 80, the total moment of section 66 about flexure axis 64 is greater than the total moment of section 68 about flexure axis 64. The movable plate therefore rotates about the flexure axis in response to acceleration normal to upper surface 62. In the beam support embodiment of FIG. 2, other geometries for movable plate 50 may be used, so long as the center of mass of the movable plate remains offset to one side of the apparent flexure axis as the movable plate rotates in response to acceleration.

Fixed plate 74 is formed in the upper surface of semiconductor layer 70, and is positioned underlying a portion of movable plate section 66. Fixed plate 76 is also formed in the upper surface of semiconductor layer 70 and underlies a portion of movable plate section 68. The fixed plates are preferably equal to one another in size and shape, and symmetrically positioned with respect to flexure axis 64. However, plates that are of different sizes and/or asymmetrically positioned plates may also be used. Conductors 74, 76 and 78 are also formed in the upper surface of the semiconductor layer, and provide electrical connections to fixed plate 74, movable plate 50, and fixed plate 76, respectively. Fixed plate 74 and movable plate 50 form a first capacitor, and movable plate 50 and fixed plate 76 form a second capacitor. Changes in the values of these capacitors are sensed to measure acceleration as described below.

Figures 3, 4:
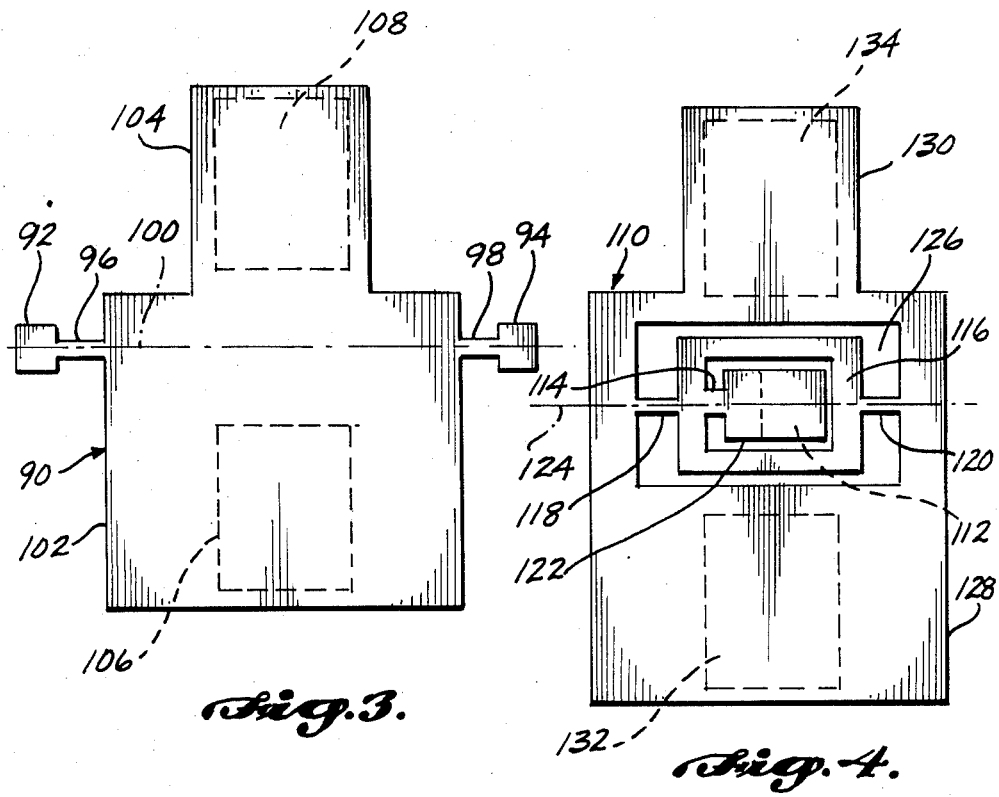
FIG. 3 is a top plan view of a third embodiment of the accelerometer.
FIG. 4 is a top plan view of a fourth embodiment of the accelerometer.

A third embodiment of the accelerometer of the present invention is illustrated in partial plan view in FIG. 3. This embodiment comprises movable plate 90 that is mounted above and parallel to the planar upper surface of a substrate by a mounting system that comprises pedestals 92 and 94 and torsion bars 96 and 98. Pedestals 92 and 94 are mounted to the upper surface of the substrate on opposite sides of movable plate 90. Torsion bar 96 extends from pedestal 92 to movable plate 90, and torsion bar 98 extends from pedestal 94 to movable plate 90. Torsion bars 96 and 98 are aligned with one another, such that they together mount the movable plate for rotation about flexure axis 100. The flexure axis divides movable plate 90 into section 102 on one side of the flexure axis and section 104 on the opposite side of the flexure axis. The total moment of section 102 about flexure axis 100 is greater than the total moment of section 104 about the flexure axis, such that the movable plate rotates in response to accelerations normal to the upper surface of the substrate. Fixed plates 106 and 108 underlie portions of sections 102 and 104 respectively, to form first and second capacitors. Electrical connections to fixed plate 106, movable plate 90 and fixed plate 108 are via conductors formed in the upper surface of the substrate.

In comparing the accelerometers shown in FIGS. 1–3, it will be noted that the accelerometer of FIG. 3 is mounted by two pedestals on opposite sides of the movable plate. As a result of this arrangement, temperature changes will cause the metal comprising the pedestals, torsion bar and movable plate to expand or contract to a greater extent than the substrate. As a result, temperature changes will introduce some stress changes in torsion bars 96 and 98. Thus, although the accelerometer shown in FIG. 3 possesses many of the advantages of the accelerometers shown in FIGS. 1 and 2, the accelerometer of FIG. 3 will be unsuitable for certain applications in which such stress results in unacceptable changes to the bias or sensitivity of the accelerometer.

A fourth embodiment of the accelerometer of the present invention is illustrated in partial plan view in FIG. 4. The embodiment of FIG. 4 includes movable plate 110 that is mounted above and parallel to the planar upper surface of a substrate by a mounting system that is in part a composite of the mounting systems shown in FIGS. 1 and 2. The mounting system in FIG. 4 is located within rectangular opening 126 of movable plate 110, and includes pedestal 112 mounted to the upper surface of the substrate, beam 114, box structure 116 and torsion bars 118 and 120. Beam 114 is connected between box structure 116 and overhanging lip 122 that extends from and is attached to pedestal 112. Torsion bars 118 and 120 connect opposite sides of box structure 116 to movable plate 110 to thereby define flexure axis 124 about which the movable plate may rotate. The movable plate is constructed such that flexure axis 124 divides the movable plate into a first section 128 on one side of the flexure axis and a section portion 130 on the opposite side of the flexure axis. The total moment of section 128 about the flexure axis is greater than the total moment of section 130 about the flexure axis, such that the movable plate rotates in response to acceleration normal to the upper surface of the substrate. The embodiment of FIG. 4 also includes fixed plates 132 and 134 that form first and second capacitors in a manner identical to the embodiments of FIGS. 1–3.

A fifth embodiment of the accelerometer of the present invention is illustrated in FIGS. 5 and 6. This embodiment is especially adapted for very large acceleration (e.g., 30,000 g) applications. For such accelerations, it is difficult to get any structure to deflect in a direction opposite to the acceleration, i.e., a movable plate would bend rather than rotate about a flexure axis. The embodiment of FIGS. 5 and 6 includes plate member 140 that is mounted above and parallel to the planar surface 142 of substrate 144 by a mounting system that comprises pedestal 146. The pedestal extends for essentially the full width of the plate member, and divides the plate member into a cantilevered beam 148 to one side of the pedestal and a second cantilevered beam 150 to the opposite side of the pedestal. Beams 148 and 150 flex towards and away from substrate 144 in response to acceleration normal to surface 142. Fixed plate 156 is formed in substrate 144 underlying beam 148, and fixed plate 158 is formed in substrate 144 underlying beam 150. Fixed plate 156 and beam 148 form a first capacitor, and fixed plate 158 and beam 154 form a second capacitor. The fixed plates and beams are formed and positioned such that in response to an acceleration normal to upper surface 142, the first and second capacitors change by different amounts. This feature is preferably implemented by making fixed plates 156 and 158 equal in size and shape and equally distant from pedestal 146, and by forming beams 148 and 150 such that the total moments of the beams about the pedestal are different from one another. FIGS. 5 and 6 illustrate this arrangement, wherein the total moment of beam 150 is greater than the total moment of beam 148.

Figure 7:
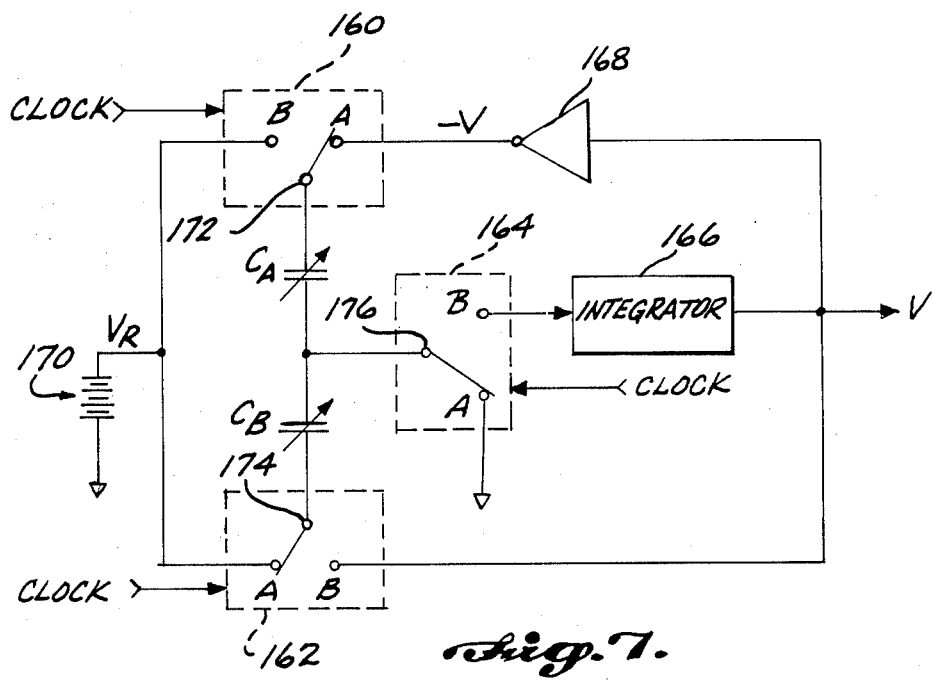
FIG. 7 is a circuit diagram of the detector.

FIG. 7 sets forth a circuit diagram for a preferred detector for converting the capacitance changes of the accelerometers of FIGS. 1–6 into an output voltage signal V representing acceleration. In FIG. 7, variable capacitor $C_A$ represents the capacitance between the movable plate (or one of the beams of the embodiment of FIGS. 5 and 6) and one of the plates fixed in the substrate, while variable capacitor $C_B$ represents the capacitance between the movable plate (or the other beam) and the other fixed plate. The detector of FIG. 7 comprises switches 160, 162 and 164, integrator 166 and unity gain inverting amplifier 168. All of the detector components may be fabricated directly on the corresponding substrate, such as substrate 12 of FIG. 1, using transistors, capacitors and resistive elements of a conventional MOS integrated circuit technology. The detector of FIG. 7 also comprises DC voltage source 170 (schematically illustrated as a battery), the DC voltage source providing reference voltages $V_R$ and ground.

Switch 160 comprises a common terminal 172 and terminals labeled A and B, the significance of the A and B terminals being described below. Terminal 172 corresponds, for example, to conductor 40 in FIG. 1. Switch 162 includes common terminal 174 and A and B terminals. Terminal 174 corresponds to conductor 44 in FIG. 1. Switch 164 includes common terminal 176 and A and B terminals. Terminal 176 corresponds to conductor 42 in FIG. 1. Switches 160, 162 and 164 are periodically switched in concert from their A positions (detector state A) to their B positions (detector state B) and then back to their A positions. The switching takes place in response to a CLOCK signal provided by a clock generator (not shown), and the switching frequency is such that the detector remains in each state for a time long enough to allow the voltages in the circuit to settle to within a small fraction of their final values in each state. With the switches in their A positions, terminal 176 is grounded, terminal 172 is connected to the output of inverting amplifier 168, and terminal 174 is connected to voltage $V_R$. The output of inverting amplifier 168 is the negative of the output voltage V of the circuit. When the switches are in their B positions, terminal 176 is connected to the input of integrator 166, terminal 172 is connected to voltage $V_R$, and terminal 174 is at voltage level V. thus in state A, capacitor $C_A$ charges to a voltage $-V$ and capacitor $C_B$ charges to a voltage $V_R$. In state B, capacitor $C_A$ charges to voltage $V_R$, and capacitor $C_B$ charges to voltage V. Thus for capacitor $C_A$, the charge difference between states A and B is $C_A \cdot (V_R - (-V))$. Similarly for capacitor $C_B$, the charge difference between states A and B is $C_B \cdot (V - V_R)$. At steady state (V essentially constant over a clock signal period), there must be no net charge transferred into integrator 166 during state B, and since the input to the integrator acts as a virtual ground, one may write:

$$C_A \cdot (V_R + V) + C_B \cdot (V - V_R) = 0 \quad (1)$$

Equation (1) may be rearranged to produce:

$$V = -V_R \left( \frac{C_A - C_B}{C_A + C_B} \right) \qquad (2)$$

The detector of FIG. 7 is stable so long as the integration capacitor or other charge storage means of integrator 166 is large in comparison to capacitors $C_A$ and $C_B$. The detector provides a low-pass filter having a cutoff frequency that depends upon the integration capacitor, the frequency of the CLOCK signal, and the sum $C_A + C_B$. The detector may therefore be implemented so as to reduce the sensitivity of the accelerometer output to vibration above a selected cut-off frequency.

The mechanical and electrical elements of the accelerometer of the present invention may be fabricated in a signal process, thereby avoiding the problems inherent in the final assembly of separately fabricated substrates or subsystems. With particular reference to the accelerometer shown in FIG. 1 and the detector shown in FIG. 7, silicon wafers containing the integrated circuit electronics for the detector as well as fixed plates 36 and 38, and conductors 40, 42 and 44 may be manufactured using, for example, a standard MOS process. The wafers are then passivated by the depositing insulating layer 34 (e.g., glass) over the top of the silicon wafer. An opening in layer 34 is provided where contact between pedestal 18 and conductor 42 is required by selective etching using hydrofluoric acid. Thin layers of chromium and nickel are deposited over the insulating layer. A spacer comprising a suitable metal is then deposited on the substrate using either a subtractive or additive photoresist process similar to those used in integrated circuit manufacture. The spacer is formed with a central opening. Gold, iron, nickel or another suitable metal is then deposited over the spacer so as to form the movable plate or plate member and the mounting system, the pedestal portion of the mounting system corresponding to the central opening in the spacer. The spacer is then etched away using an etchant that attacks the spacer material without damaging other materials used, leaving movable plate 10 unsupported except where torsion bars 20 and 22 are attached to pedestal 18. Finally, the conductive metal deposited over the substrate is etched away, except where it is covered by the pedestal, using an appropriate etchant.

As may be appreciated, the accelerometer of the present invention provides a number of significant advantages with respect to prior accelerometers. The accelerometer of the present invention may be fabricated on a silicon substrate using conventional integrated circuit technology and without the need for a separate assembly step for combining the mechanical and electrical components of the accelerometer. The use of metal for the movable plate or plate member provides a comparatively dense material for the inertial mass of the sensing element. The use of two capacitors on opposite sides of a flexure axis substantially cancels the electrostatic forces caused by the measuring voltages, thereby reducing a significant source of error. The use of two capacitors also makes possible a differential output that has increased sensitivity and decrease susceptibility to errors due to thermal coefficients of the capacitors. Finally, for a number of the embodiments illustrated herein, the use of a single pedestal reduces the sensitivity of the accelerometer to errors caused by differential thermal expansion between the metal plate and the silicon substrate.

While the preferred embodiments of the invention have been illustrated and described, it should be understood that variations will be apparent to those skilled in the art. Accordingly, the invention is not be limited to the specific embodiments illustrated and described, and the true scope and spirit of the invention are to be determined by reference to the following claims.

The embodiments of the invention in which an exclusive property or privilege is claimed are defined as follows:

1. An accelerometer, comprising:
   a substrate;
   a sensing element comprising a metallic member, the sensing element including an internal opening;
   mounting means positioned within said opening for mounting the sensing element such that the sensing element is positioned above the substrate and can rotate about a flexure axis that is above and substantially parallel to the substrate, the mounting means comprising a pedestal mounted to the substrate and flexible support means connected between the sensing element and the pedestal, the support means comprising a single beam extending between the sensing element and pedestal in a direction parallel to the sensing element and substrate and perpendicular to the flexure axis, the beam forming the only connection between the sensing element and pedestal, the flexure axis dividing the sensing element into a first section on one side of the flexure axis and a second section on the opposite side of the flexure axis from the first section, the total moments of the first and second sections about the flexure axis being different from one another, whereby acceleration normal to the substrate tends to rotate the sensing element about the flexure axis; and
   means for sensing rotation of the sensing element about the flexure axis.

2. The accelerometer of claim 1, wherein the sensing element has a center of mass that is located approximately at the point where the beam is connected to the sensing element, whereby the flexure axis intersects the beam at a location spaced from the pedestal by a distance equal to one third the length of the beam.

3. An accelerometer, comprising:
   a substrate;
   a sensing element comprising a metallic member;
   mounting means for mounting the sensing element above the substrate, the mounting means comprising a pedestal connected between the substrate and the sensing element, the pedestal dividing the sensing element into a first beam to one side of the pedestal and a second beam on the opposite side of the pedestal, each beam being adapted to flex towards and away from the substrate in response to acceleration normal to the substrate;
   first and second electrodes mounted by the substrate adjacent the first and second beams respectively, the first electrode and first beam together forming a first capacitor, the second electrode and second beam together forming a second capacitor, and the first and second beams and first and second electrodes being arranged such that the capacitances of the first and second capacitors change by different amounts in response to acceleration normal to the substrate; and detection means coupled to the first and second capacitors for sensing differential change in said capacitors.

4. The accelerometer of claim 3, wherein each beam comprises a metal plate mounted to the pedestal such that the plate is substantially parallel to the substrate.

5. The accelerometer of claim 3, wherein the substrate comprises a semiconductor.

6. The accelerometer of claim 3, wherein the first and second electrodes are identical in size and shape, and symmetrically positioned on opposite sides of the pedestal, and wherein the total moment of the first beam about the pedestal is different from the total moment of the second beam about the pedestal.

7. An accelerometer for measuring acceleration along a sensitive axis, comprising:
 (a) an inertial mass;
 (b) mounting means for mounting the inertial mass such that the inertial mass tends to move in response to acceleration along the sensitive axis;
 (c) first and second capacitors associated with the inertial mass such that when the inertial mass moves, the capacitances of the first and second capacitors change by unequal amounts, each of the first and second capacitors comprising first and second plates; and
 (d) detection means for measuring the relative capacitances of the first and second capacitors and providing a corresponding output signal, the detection means comprising:
  (i) means for providing first and second reference voltages;
  (ii) an output terminal at which the output signal is produced;
  (iii) an inverting amplifier having its input connected to the output terminal;
  (iv) an integrator having its output connected to the output terminal;
  (v) a first switch having a common terminal and A and B terminals, the common terminal of the first switch being connected to the first plates of the first and second capacitors, the A terminal of the first switch being connected to receive the first reference voltage and the B terminal of the first switch being connected to the input of the integrator;
  (vi) a second switch having a common terminal and A and B terminals, the common terminal of the second switch being connected to the second plate of the first capacitor, the A terminal of the second switch being connected to the output of the inverting amplifier, and the B terminal of the second switch being connected to receive the second reference voltage;
  (vii) a third switch having a common terminal and A and B terminals, the common terminal of the third switch being connected to the second plate of the second capacitor, the A terminal of the third switch being connected to receive the second reference voltage, and the B terminal of the third switch being connected to the output terminal; and
  (viii) means for causing the first, second and third switches to periodically change in concert between state A wherein all switches connect their common terminals to their A terminals and state B wherein all switches connect their common terminals to their B terminals.

8. An accelerometer, comprising:
a substrate;
a sensing element comprising a metallic member, the sensing element including an internal opening;
mounting means positioned within said opening for mounting the sensing element such that the sensing element is positioned above the substrate and can rotate about a flexure axis that is above and substantially parallel to the substrate, the mounting means comprising a pedestal mounted to the substrate and flexible support means connected between the sensing element and the pedestal, the support means comprising an element surrounding the pedestal, a beam extending between the pedestal and the element, and a pair of torsion members extending in opposite directions from the element to the sensing element, the flexure axis dividing the sensing element into a first section on one side of the flexure axis and a second section on the opposite side of the flexure axis from the first section, the total moments of the first and second sections about the flexure axis being different from one another, whereby acceleration normal to the substrate tends to rotate the sensing element about the flexure axis; and
means for sensing rotation of the sensing element about the flexure axis.

* * * * *